United States Patent [19]

Iwadare

[11] Patent Number: 5,218,561
[45] Date of Patent: Jun. 8, 1993

[54] FAST CALCULATION APPARATUS FOR CARRYING OUT A FORWARD AND AN INVERSE TRANSFORM

[75] Inventor: Masahiro Iwadare, Tokyo, Japan

[73] Assignee: NEC Corporation, Tokyo, Japan

[21] Appl. No.: 712,888

[22] Filed: Jun. 12, 1991

[30] Foreign Application Priority Data

Jun. 12, 1990 [JP] Japan .................................. 2-151662

[51] Int. Cl.$^5$ ............................................. G06F 7/38
[52] U.S. Cl. .................................................. 364/725
[58] Field of Search .............................. 364/725, 726

[56] References Cited

PUBLICATIONS

H. Nussbaumer, "Fast Multidimensional Discrete Cosite Transforms", IBM Technical Disclosure Bulletin, vol. 23, No. 5, Oct. 1980, pp. 1976–1981.

H. Nussbaumer, "Improved Approach for the Computation of Multidimensional Cosine Transforms", IBM Technical Disclosure Bulletin, vol. 23, No. 10, Mar. 1981, pp. 4517–4521.

Schiller, N., "Overlapping Block Transform Image Coding Preserving Equal Number of Samples and Coefficients", SPIE vol. 1001 Visual Communications and Image Processing 1988, pp. 834–839.

*Primary Examiner*—Long T. Nguyen
*Attorney, Agent, or Firm*—Foley & Lardner

[57] ABSTRACT

In an apparatus for carrying out a linear transform calculation on a product signal produced by multiplying a predetermined transform window function and an apparatus input signal, an FFT part (23) carries out fast Fourier transform on a processed signal produced by processing the product signal in a first processing part (21). As a result, the FFT part produces an internal signal which is representative of a result of the fast Fourier transform. A second processing part (22) processes the internal signal into a transformed signal which represents a result of the linear transform calculation. The apparatus is applicable to either of forward and inverse transform units (11, 12).

12 Claims, 7 Drawing Sheets

EAST CALCULATION APPARATUS FOR CARRYING OUT A FORWARD AND AN INVERSE TRANSFORM

BACKGROUND OF THE INVENTION

This invention relates to a fast calculation apparatus included in each of a forward transform calculation apparatus and an inverse transform calculation apparatus.

A modified discrete cosine transform (hereinafter abbreviated to MDCT) apparatus is known as a linear transform apparatus for a digital signal such as an audio signal and a picture signal. In a conventional transform calculation apparatus, it is possible by the use of the MDCT technique to carry out a forward and an inverse transform calculation which are well known in the art.

The MDCT apparatus is described in detail in an article contributed by N. Schiller to the SPIE Vol. 1001 Visual Communications and Image Processing '88, pages 834-839, under the title of "Overlapping Block Transform for Image Coding Preserving Equal Number of Samples and Coefficients". The article will be described below.

In the MDCT technique, a forward transform equation and an inverse transform equation are given:

$$y(m, k) = \sum_{n=0}^{N-1} x(n)h(n)\cos[2\pi(k + 1/2)(n + n0)/N] \quad (1)$$

and $$xf(m, n) = 2f(n)/N \sum_{k=0}^{N-1} y(m, k)\cos[2\pi(k + 1/2)(n + n0)/n], \quad (2)$$

wherein x represents an input signal, N represents a block length (N is multiple of 4), m represents a block number, h represents a forward transform window function, f represents an inverse transform window function, each of n and k represents an integer variable between 0 and N−1, both inclusive. Herein, n0 is given as follows:

$$n0 = N/4 + \frac{1}{2}. \quad (3)$$

It is necessary in each of the forward and the inverse transform calculations to carry out a large number of multiplication times and addition times. This is because k is the integer between 0 and (N−1), both inclusive. Accordingly, an increase in the block length N results in an increased number of times of each of the multiplication and the addition.

SUMMARY OF THE INVENTION

It is therefore an object of this invention to provide a forward transform calculation apparatus by which it is possible to reduce the number of times of multiplication and addition.

It is another object of this invention to provide an inverse transform calculation apparatus by which it is possible to reduce the number of times of the multiplication and the addition.

It is still another object of this invention to provide a calculation apparatus in which the number of times of the multiplication and the addition increases in proportion to only $N\log_2 N$, where N represents an integer.

It is yet another object of this invention to provide a calculation apparatus in which the number of times of the multiplication and the addition increases in proportion to $(N/2)\log_2(N/2)$, where N represents an integer.

Other object of this invention will become clear as the description proceeds.

According to an aspect of this invention, there is provided an apparatus for carrying out a forward transform calculation on an apparatus input signal. The apparatus includes multiplying means for multiplying a predetermined forward transform window function and the apparatus input signal to produce a multiplied signal and transform carrying out means for carrying out a linear forward transform on the product signal to produce a forward signal representative of a result of the linear forward transform. The transform carrying out means comprises first processing means connected to the multiplying means for processing the product signal into a processed signal, internal transform carrying out means connected to the first processing means for carrying out a forward fast Fourier transform on the processed signal to produce an internal signal representative of a result of the forward fast Fourier transform, and second processing means connected to the internal transform carrying out means for processing the internal signal into the forward transformed signal.

According to another aspect of this invention, there is provided an apparatus for carrying out an inverse transform calculation on an apparatus input signal. The apparatus includes transform carrying out means for carrying out a linear inverse transform on the apparatus input signal to produce an inverse signal representative of a result of the linear inverse transform and multiplying means for multiplying a predetermined inverse transform window function and the inverse signal to produce a product signal. The transform carrying out means comprises first processing means for processing the apparatus input signal into a processed signal, internal transform carrying out means connected to the first processing means for carrying out an inverse fast Fourier transform on the processed signal to produce an internal signal representative of a result of the inverse fast Fourier transform, and second processing means connected to the internal transform carrying out means for processing the internal signal into the inverse transformed signal.

DESCRIPTION OF THE PREFERRED EMBODIMENTS

Figure 1:
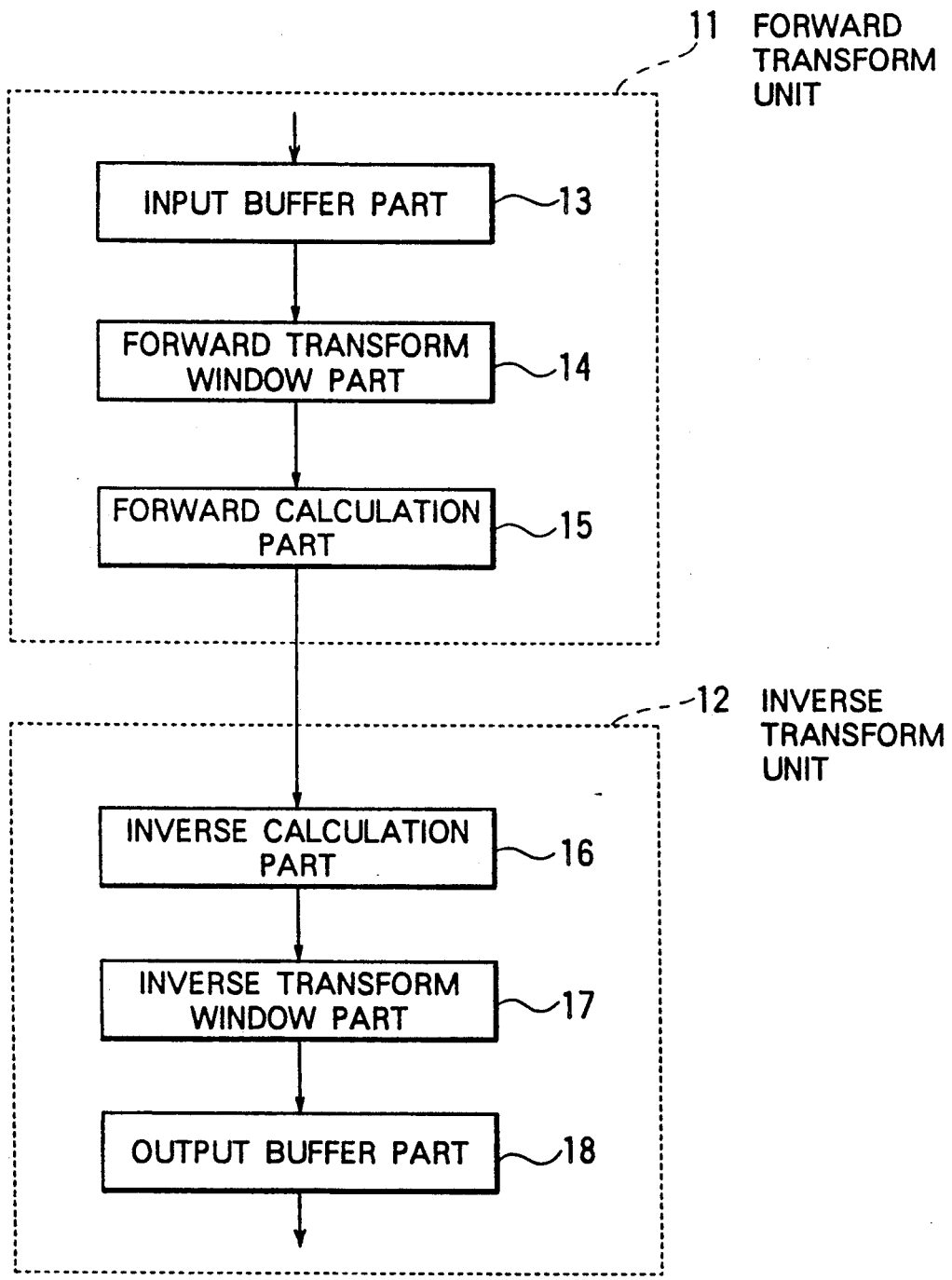
FIG. 1 is a block diagram of a conventional calculation apparatus for successively carrying out a forward and an inverse transform.

Referring to FIG. 1, a conventional calculation apparatus will be described at first for a better understanding of the present invention. The conventional calculation apparatus is for successively carrying out a forward and an inverse transform and comprises forward and inverse transform units 11 and 12.

The forward transform unit 11 comprises an input buffer part 13, a forward transform window part 14, and a forward calculation part 15. The input buffer part 13 is for memorizing N samples of original signals x(n), as an original data block. This means that the original data block has an original block length N. Responsive to the original signals x(n), the forward transform window part 14 carries out multiplication between each of the original signals x(n) and the forward transform window function h(n) to produce a product signal xh(n) as follows:

$$xh(n) = x(n)h(n). \tag{4}$$

Responsive to the product signal xh(n), the forward calculation part 15 calculates the left-hand side of Equation (1) as follows:

$$y(m, k) = \sum_{n=0}^{N-1} xh(n)\cos[2\pi(k + 1/2)(n + n0)/N]. \tag{5}$$

The calculation part produces the left-hand side as a forward transformed signal y(m, k). It is necessary to carry out multiplication $N^2$ times and addition $N(N-1)$ times. This is because k is variable between 0 and (N−1), both inclusive. Depending on the circumstances, each sample of the original signals x(n) is herein called an apparatus input signal.

The inverse transform unit 12 comprises an inverse calculation part 16, an inverse transform window part 17, and an output buffer part 18. The inverse calculation part 16 calculates the left-hand side of Equation (2) as follows:

$$xt(m, n) = 2/N \sum_{k=0}^{N-1} y(m, k)\cos[2\pi(k + 1/2)(n + n0)/n]. \tag{6}$$

The calculation part 16 produces the left-hand side as an inverse transformed signal xt(m, n). The inverse transform window part 17 multiplies the inverse transformed signal xt(m, n) and an inverse transform window function f(n) into a product in accordance with:

$$xf(m, n) = xt(m, n)f(n). \tag{7}$$

The inverse transform window part 17 thereby produces a product signal xf(m, n) representative of the product.

The product signal is supplied to the output buffer part 18 whenever the multiplication is carried out by the inverse transform window part 17. As a result, the output buffer part 18 memorizes a plurality of the product signals as a current and a previous data block at a time. The current data block corresponds to the original data block. The previous data block is previous to the current data block. Each of the current and the previous data blocks is divided into a former and a latter half block. The former half block comprises zeroth through (N/2−1)-th product signals. The latter half block comprises N/2-th through (N−1)-th product signals.

As will be understood from the following equation, the output buffer part 18 carries out addition between the product signal xf(m, n) of the former half block of the current data block and the product signal xf(m−1, n) of the latter half block of the previous data block to produce a modified or reproduced signal x'(n) of a modified half block having a modified block length which is a half of the original block length. The following equation is:

$$x'(n) = xf(m - 1, n + N/2) + xf(m, n), \tag{8}$$
when $0 \leq n < N/2 - 1$.

Simultaneously, the output buffer part 18 memorizes, as the latter half block, the second product signal xf(m, n) of the current data block. Each of the forward and the inverse transform window functions h(n) and f(n) can be given by Equation (9) on page 836 in the above-mentioned article.

The description will now proceed to an example of an algorithm which is applicable to a forward transform calculation apparatus according to this invention. Substituting Equation (3), Equation (5) is rewritten into:

$$\begin{aligned} y(m, k) &= \sum_{n=0}^{N-1} xh(n)\cos[2\pi(k + 1/2)(n + n0)/N] \\ &= \sum_{n=0}^{N-1} xh(n)\cos[2\pi(k + 1/2)(n + N/4 + 1/2)/N] \\ &= \sum_{n=N/4}^{5N/4-1} xh(n - N/4)\cos[2\pi(k + 1/2)(n + 1/2)/N] \end{aligned} \tag{9}$$

In Equation (9), the cosine has a nature such that:

$$\begin{aligned} &\cos[2\pi(k + 1/2)(n + 1/2)/N] \\ &= \cos[2\pi(k + 1/2)(n - N) + 1/2 + N)/N] \\ &= \cos[2\pi(k + 1/2)((n - N) + 1/2)/N + 2\pi(k + 1/2)N/N] \\ &= -\cos[2\pi(k + 1/2)((n - N) + 1/2)/N] \end{aligned} \tag{10}$$

When n is shifted by (−N), the cosine has an argument shifted by $2\pi(k+\frac{1}{2})$, namely, an odd integral multiple of $\pi$. In this event, the cosine has an absolute value unchanged and a sign inverted between positive and negative. Therefore, it is possible to delete the term N/4 in the argument of xh in the right-hand side of Equation (9) by shifting n by (−N) with the sign of the product signal xh(n) inverted.

Herein, the product signal is processed into particular and specific datum x2(n) which are represented as follows:

$$x2(n) = -xh(n + 3N/4), \tag{11a}$$
when $0 \leq n < N/4$ and $$x2(n) = xh(n - N/4), \tag{11b}$$
when $N/4 \leq n < N$.

Therefore:

$$\begin{aligned} y(m, k) &= \sum_{n=0}^{N-1} x2(n)\cos[2\pi(k + 1/2)(n + 1/2)/N] \\ &= real\left[\sum_{n=0}^{N-1} x2(n)\exp(-2\pi j(k + 1/2)(n + 1/2)/N)\right] \end{aligned} \tag{12}$$

-continued $$= real\left[\sum_{n=0}^{N-1} x2(n) \times \right.$$

$$\left. \exp(-2\pi j(k + 1/2)/2N - 2\pi j(k + 1/2)n/N)\right]$$

$$= real\left[\exp(-\pi 2j(k + 1/2)/2N) \times \right.$$

$$\left. \sum_{n=0}^{N-1} x2(n)\exp(-2\pi j(k + 1/2)n/N)\right]$$

$$= real\left[\exp(-2\pi j(k + 1/2)/2N) \times \right.$$

$$\left. \sum_{n=0}^{N-1} x2(n)\exp(-2\pi jn/2N - 2\pi jkn/N)\right]$$

$$= real\left[\exp(-2\pi j(k + 1/2)/2N) \times \right.$$

$$\left. \sum_{n=0}^{N-1} x2(n)\exp(-2\pi jn/2N)\exp(-2\pi jkn/N)\right],$$

where j represents an imaginary unit.
It will be assumed that:

$$x3(n) = x2(n)\exp(-2\pi jn/2N). \quad (13)$$

In this event:

$$y(m, k) = real\left[\exp(-2\pi j(k + 1/2)/2N) \times \right. \quad (14)$$

$$\left. \sum_{n=0}^{N-1} x3(n)\exp(-2\pi jkn/N)\right].$$

Herein, Equation (14) is divided into a front part and a rear part which represents execution of a fast Fourier transform (hereinafter abbreviated to FFT) at a point N of a specific signal x3(n). The FFT is represented by Equation (15) which is given below.

Accordingly, Equation (16) is given from Equation (14).

$$xf(m, k) = \sum_{n=0}^{N-1} x3(n)\exp(-2\pi jkn/N) \quad (15)$$

and $$y(m, k) = real[\exp(-2\pi j(k + 1/2)/2N)xf(m, k)]. \quad (16)$$

It is therefore possible to obtain the result of Equation (5).

The multiplications are required N times before execution of the FFT, at most $N\log_2 N$ times for executing the FFT, and N times after execution of the FFT. As a result, the multiplication is carried out the number of times which is substantially equal to $N\log_2 N$ if N is great. The number of times of the addition is equal to $2N\log_2 N$. Accordingly, it is possible to reduce the number of times of the multiplication and the addition as compared with the conventional calculation apparatus.

The description will proceed to an example of an algorithm which is applicable to an inverse transform calculation apparatus according to this invention. Substituting Equation (3), Equation (6) is rewritten into:

$$xt(m, n) = 2/N \sum_{k=0}^{N-1} y(m, k)\cos[2\pi(n + n0)(k + 1/2)/N] \quad (17)$$

$$= 2/N \sum_{k=0}^{N-1} y(m, k)\cos[2\pi(n + N/4 + 1/2)(k + 1/2)/N]$$

$$= 2/Nreal\left[\sum_{k=0}^{N-1} y(m, k) \times \right.$$

$$\left. \exp(2\pi j(n + N/4 + 1/2)(k + 1/2)/N)m\right]$$

$$= 2/Nreal\left[\sum_{k=0}^{N-1} y(m, k) \times \right.$$

$$\left. \exp(2\pi j(n + N/4 + 1/2)/2N + 2\pi j(n + N/4 + 1/2)k/N)\right]$$

$$= 2/Nreal\left[\exp(2\pi j(n + N/4 + 1/2)/2N) \times \right.$$

$$\left. \sum_{k=0}^{N-1} y(m, k)\exp(2\pi j(n + N/4 + 1/2)k/N)\right]$$

$$= 2/Nreal\left[\exp(2\pi j(n + N/4 + 1/2)/2N) \times \right.$$

$$\left. \sum_{k=0}^{N-1} y(m, k)\exp(2\pi j(N/4 + 1/2)k/N + 2\pi jnk/N)\right]$$

$$= 2/Nreal\left[\exp(2\pi j(n + N/4 + 1/2)/2N) \times \right.$$

$$\left. \sum_{k=0}^{N-1} y(m, k)\exp(2\pi j(N/4 + 1/2)k/N)\exp(2\pi jnk/N)\right].$$

The following equations are introduced:

$$y2(m, k) = y(m, k)\exp[2\pi j(N/4 + 1/2)k/N] \quad (18)$$

and $$y3(m, k) = \sum_{k=0}^{N/2-1} y2(m, k)\exp(2\pi jnk/N). \quad (19)$$

Equation (19) represents the inverse FFT for the signal y2(m, k). Substituting Equations (18) and (19) in Equation (17):

$$(20)$$

$$xt(m, n) = 2/Nreal[\exp(2\pi j(n + N/4 + 1/2)/2N)y3(m, n)].$$

It is therefore possible to obtain the result of Equation (6).

The multiplication is carried out the number of times which is substantially equal to $N\log_2 N$. The number of times of the addition is equal to $2N\log_2 N$. Accordingly, it is possible to reduce the number of times of the multiplication and the addition as compared with the conventional apparatus.

The description will now proceed to another example of the algorithm that is applicable to the forward transform calculation apparatus according to this invention. With p substituted for n, Equation (9) is rewritten into:

$$y(m, k) = \sum_{p=N/4}^{5N/4-1} xh(p - N/4)\cos[2\pi(k + 1/2)(p + 1/2)/N]. \quad (21)$$

It is possible to delete the term $N/4$ in the argument of $xh$ in the right-hand side of Equation (21) by shifting p by $(-N)$ with the sign of the product signal $xh(p)$ inverted.

Herein, the product signal is processed into the particular and the specific data $x2(p)$ which are represented as follows:

$$x2(p) = -xh(p + 3N/4), \quad (22a)$$
when $0 \leq p < N/4$ and $$x2(p) = xh(p + N/4), \quad (22b)$$
when $N/4 \leq p < N$.

Therefore:

$$y(m, k) = \sum_{p=0}^{N-1} x2(p)\cos[2\pi(k + 1/2)(p + 1/2)/N] \quad (23)$$

In Equation (23), the cosine has a nature such that:

$$\cos[2\pi(k + 1/2)(p + 1/2)/N] \quad (24)$$
$$= \cos[-2\pi(k + 1/2)(p + 1/2)/N]$$
$$= \cos[2\pi(k + 1/2)((N - p - 1/2) - N)/N]$$
$$= \cos[2\pi(k + 1/2)((N - 1 - p) + 1/2)/N - 2\pi(k + 1/2)N/N]$$
$$= -\cos[2\pi(k + 1/2)((N - p - 1) + 1/2)/N]$$

When $(N-1-p)$ is substituted for p, the cosine has an absolute value unchanged and a sign inverted between positive and negative. With p separated into an even and an odd number, Equation (23) is rewritten into:

$$y(m, k) = \sum_{p=0}^{N/2-1} x2(2p)\cos[2\pi(k + 1/2)(2p + 1/2)/N] + \quad (25)$$

$$\sum_{p=0}^{N/2-1} x2(N - 1 - 2p)\cos[2\pi(k + 1/2) \times$$

$$(N - 1 - 2p + 1/2)/N]$$

$$= \sum_{p=0}^{N/2-1} [x2(2p) - x2(p - 1 - 2p)] \times$$

$$\cos[2\pi(k + 1/2)(2p + 1/2)/N]$$

It is assumed that:

$$x3(p) = x2(2p) - x2(N - 1 - 2p), \quad (26)$$
when $0 \leq p \leq N/2 - 1$.

In this event:

$$y(m, k) = \sum_{n=0}^{N/2-1} x3(n)\cos[2\pi(k + 1/2)(2n + 1/2)/n] \quad (27)$$

-continued $$= real\left[\sum_{n=0}^{N/2-1} x3(n)\exp(-2\pi j(k + 1/2)(2n + 1/2)/N)\right]$$

$$= real\left[\sum_{n=0}^{N/2-1} x3(n) \times \right.$$
$$\left. \exp(-2\pi j(k + 1/2)/2N - 2\pi j(k + 1/2)2n/2)\right]$$

$$= real\left[\exp(-2\pi j(k + 1/2)/2N) \times \right.$$
$$\left. \sum_{n=0}^{N/2-1} x3(n)\exp(-2\pi j(2k + 1)n/N)\right]$$

$$= real\left[\exp(-2\pi j(k + 1/2)/2N) \times \right.$$
$$\left. \sum_{n=0}^{N/2-1} x3(n)\exp(-2\pi jn/N - 2\pi jk2n/N)\right]$$

$$= real\left[\exp(-2\pi j(k + 1/2)/2N) \times \right.$$
$$\left. \sum_{n=0}^{N/2-1} x3(n)\exp(-2\pi jn/N)\exp(-2\pi jkn/(N/2))\right]$$

It is assumed that:

$$x4(p) = x3(p)\exp(-2\pi jp/N). \quad (28)$$

In this event:

$$y(m, k) = real\left[\exp(-2\pi j(k + 1/2)/2N) \times \right. \quad (29)$$
$$\left. \sum_{p=0}^{N/2-1} x4(p)\exp(-2\pi jkp/(N/2))\right]$$

Herein, Equation (14) is divided into a front part and a rear part which represents execution of the FFT at $N/2$ of $x4(p)$. The FFT is represented by Equation (30) which is given below. Accordingly, Equation (31) is given from Equation (29).

$$xf(m, k) = \sum_{p=0}^{N/2-1} x4(p)\exp[-2\pi jkp/(N/2)] \quad (30)$$

$$y(m, k) = real[\exp(-2\pi j(k + 1/2)/2N)xf(m, k)] \quad (31)$$

It is therefore possible to obtain the result of Equation (5).

The multiplication is carried out the number of times which is substantially equal to $(N/2) \log_2 (N/2)$ if N is great. The total number of the addition and the subtraction is equal to $N/2$ for $x3(p)$ and to $N\log_2(N/2)$ for FFT. The number of the addition is substantially equal to $N\log_2(N/2)$ if N is great. Accordingly, it is possible to reduce the number of times of the multiplication and the addition as compared with the conventional calculation apparatus.

Since the FFT is carried out at N/2 points, y(m, n) is obtained in a case where k is variable between 0 and N/2−1, both inclusive. In Equation (24), p and k are symmetrical with one another. Using the symmetric nature of the cosine with respect to k, Equation (23) is rewritten into:

$$y(m, k) = \sum_{n=0}^{N-1} x2(n)\cos[2\pi(k + 1/2)(n + 1/2)/N] \quad (32)$$

$$= \sum_{n=0}^{N-1} -x2(n)\cos[2\pi((N - 1 - k) + 1/2)(n + 1/2)/N]$$

$$= -y(m, N - 1 - k).$$

Therefore, y(m, k) is obtained in another case where k is variable between N/2 and N−1, both inclusive.

The description will proceed to another example of the algorithm that is applicable to the inverse transform calculation apparatus according to this invention. Substituting Equation (3) with p substituted for n, Equation (6) is rewritten into:

$$xt(m, n) = 2/N \sum_{k=0}^{N-1} y(m, k)\cos[2\pi(p + p0)(k + 1/2)/N] \quad (33)$$

$$= 2/N \sum_{k=0}^{N-1} y(m, k)\cos[2\pi(p + N/4 + 1/2)(k + 1/2)/N].$$

For convenience of the equation, it will be assumed that:

$$xt2(m, p) = xt(m, p - N/4). \quad (34)$$

In this event:

$$xt2(m, p) = 2/N \sum_{k=0}^{N-1} y(m, k)\cos[2\pi(p + 1/2)(k + 1/2)/N] \quad (35)$$

$$= 2/N \left[ \sum_{k=0}^{N/2-1} y(m, 2k)\cos(2\pi(p + 1/2)(2k + 1/2)/N) + \sum_{k=0}^{N/2-1} y(m, N - 1 - 2k) \times \cos(2\pi(p + 1/2)(N - 1 - 2k + 1/2)/N) \right]$$

$$= 2/N \left[ \sum_{k=0}^{N/2-1} (y(m, 2k) - y(m, N - 1 - 2k)) \times \cos(2\pi(p + 1/2)(2k + 1/2)/N) \right].$$

Substituting Equation (31):

$$xt2(m, p) = \quad (36)$$

$$2/N \left[ \sum_{k=0}^{N/2-1} 2y(m, 2k)\cos(2\pi(p + 1/2)(2k + 1/2)/N) \right].$$

Herein, y2(m, k) is represented as follows:

$$y2(m, k) = y(m, 2k), \quad (37a)$$
when $0 \leq k < N/4$ $$y2(m, k) = -y(m, k), \quad (37b)$$
when $N/4 \leq k < N/2$.

Using Equation (32), Equation (37b) is represented as follows:

$$y2(m, k) = -(m, N - 1 - 2k), \quad (37c)$$
when $N/4 \leq k < N/2$.

Equation (35) is rewritten into:

$$xt2(m, p) = 4/N \, real\left[ \sum_{k=0}^{N/2-1} y/2(m, k) \times \right. \quad (38)$$

$$\left. \exp(2\pi j(p + 1/2)(2k + 1/2)/N) \right]$$

$$= 4/N \, real\left[ \sum_{k=0}^{N/2-1} y2(m, k) \times \right.$$

$$\left. \exp(2\pi j(p + 1/2)/2N + 2\pi j(p + 1/2)2k/N) \right]$$

$$= 4/N \, real\left[ \exp(2\pi j(p + 1/2)/2N) \times \right.$$

$$\left. \sum_{k=0}^{N/2-1} y2(m, k)\exp(2\pi j(2p + 1)k/N) \right]$$

$$= 4/N \, real\left[ \exp(2\pi j(p + 1/2)/2N) \times \right.$$

$$\left. \sum_{k=0}^{N/2-1} y2(m, k)\exp(2\pi jk/N + (2\pi jpk/(N/2))) \right]$$

It is assumed that:
$$y3(m, k) = y2(m, k)\exp(2\pi jk/N) \quad (39)$$

$$y4(m, p) = \sum_{k=0}^{N/2-1} y3(m, k)\exp[2\pi jpk/(N/2)] \quad (40)$$

Equation (40) represents an inverse FFT for y3(m, k). Substituting Equations (39) and (40) into Equation (38):

$$xt2(m, n) = 4/N \, real[\exp(2\pi j(n + 1/2)/2N)y4(m, n)]. \quad (41)$$

In order to convert xt2(m, n) to xt(m, n), it is assumed from Equations (20), (24), and (32) that:

$$xt(m, 3N/4 - 1 - n) = xt(m, 3N/4 + n) \quad (42a)$$
$$= -xt2(m, n)$$
when $0 \leq n < N/4$ It is therefore possible to obtain the result of Equation (6).

The multiplication is carried out the number of times which is substantially equal to (N/2) log₂ (N/2). The addition is carried out the number of times which is substantially equal to Nlog₂ (N/2). Accordingly, it is possible to reduce the number of times of the multiplication and the addition as compared with the conventional calculation apparatus.

Figure 2:
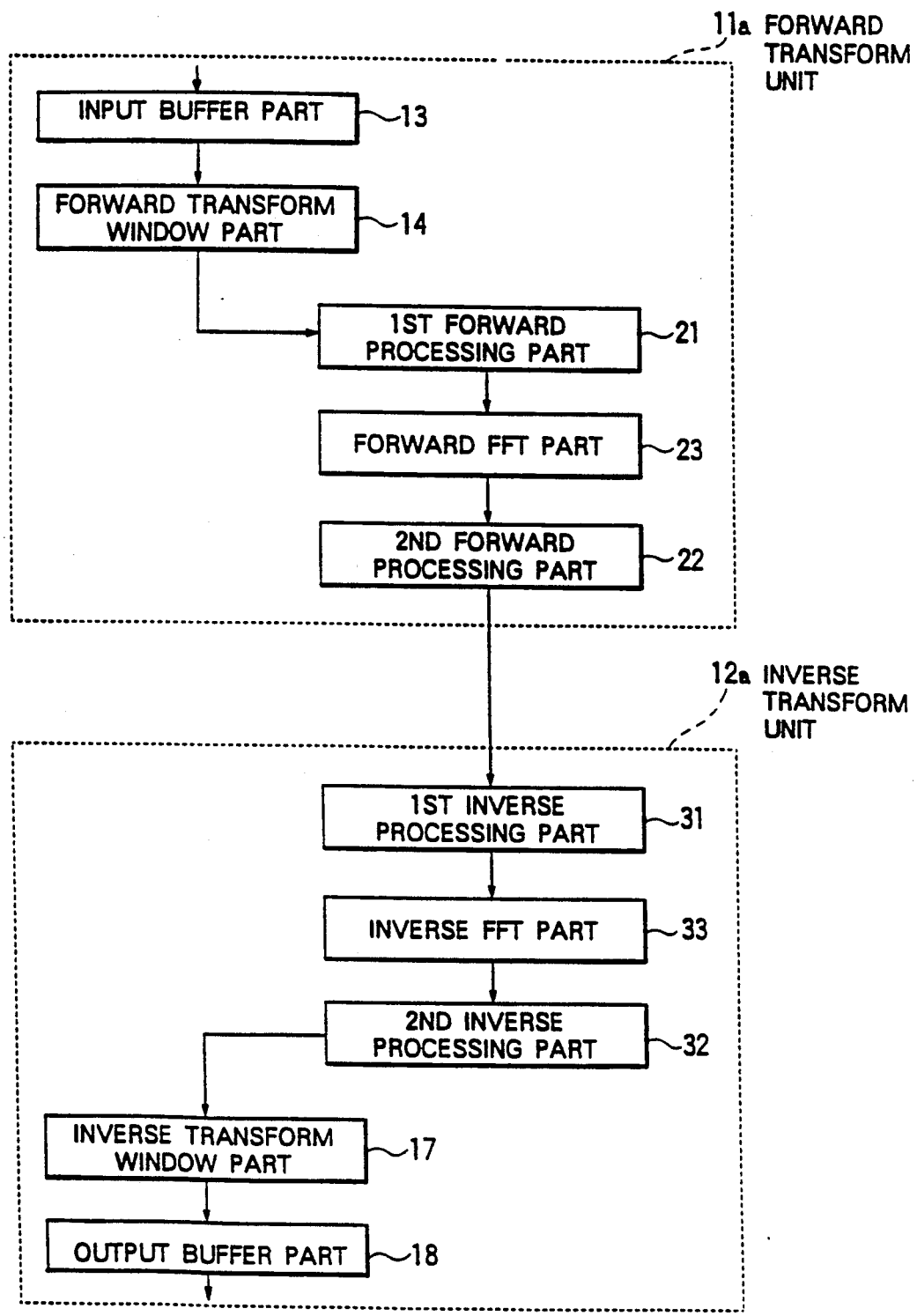
FIG. 2 is a block diagram of a calculation apparatus according to a first embodiment of this invention.

Referring to FIG. 2, the description will be directed to a calculation apparatus according to a first embodiment of this invention. The calculation apparatus comprises similar parts designated by like reference numerals. The forward transform window part 14 produces, as the product signal, a succession of zeroth through (3N/4−1)th and (3N/4)th through (N−1)th product data. The forward transform window part 14 will be referred to as a multiplying arrangement.

The forward transform unit 11a further comprises first forward processing, second forward processing, and forward FFT parts 21, 22, and 23. The first forward processing part 21 is connected to the forward transform window part 14 and is for processing the product signal into a processed signal.

Figure 3:
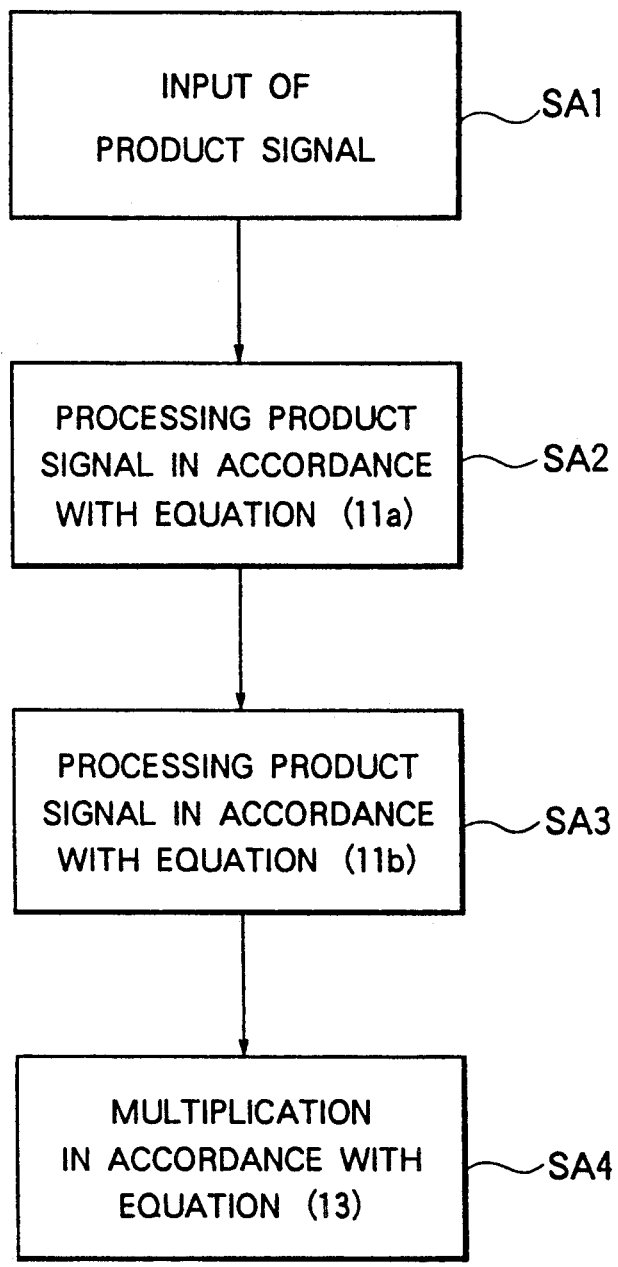
FIG. 3 is a flow chart for use in describing operation of a first forward processing part included in the calculation apparatus of FIG. 2.

Referring to FIG. 3 together with FIG. 2, the description will be made as regards operation of the first forward processing part 21. At a first stage SA1, the first forward processing part 21 is supplied with the product signal from the forward transform window part 14. The first stage SA1 proceeds to a second stage SA2 at which the first forward processing part 21 processes the (3N/4)th through the (N−1)th product data into a succession of zeroth through (N/4−1)th particular data having a negative polarity or sign in common. In other words, the zeroth through the (N/4−1)th product data are processed in accordance with Equation (11a). The first forward processing part 21 for carrying out the second stage SA2 will be referred to as a particular processing arrangement.

The second stage SA2 proceeds to a third stage SA3 at which the first forward processing part 21 processes the zeroth through the (3N/4−1)th product data into a succession of (N/4)th through (3N/4−1)th specific data having a positive polarity or sign in common. In other words, the (N/4)th through the (N−1)th product data are processed in accordance with Equation (11b). The first forward processing part 21 for carrying out the third stage SA3 will be referred to as a specific processing arrangement.

The third stage SA3 proceeds to a fourth stage SA4 at which the first forward processing part 21 multiplies $\exp[-2\pi jn/(2n)]$ and each of the (3N/4) through the N-th particular and the zeroth through the (3N/4−1)th specific data in accordance with Equation (13) to produce the processed signal. The first forward processing part 21 for carrying out the fourth stage SA4 will be referred to as a calculating arrangement.

Returning to FIG. 2, the forward FFT part 23 is connected to the first forward processing part 21 and is for carrying out a linear forward FFT on the processed signal in accordance with Equation (15) to produce an internal signal representative of a result of the forward FFT. The forward FFT part 23 is herein referred to as an internal transform carrying out arrangement.

The second forward processing part 22 is connected to the forward FFT part 23 and is for processing the internal signal into the forward transformed signal in accordance with Equation (16). More particularly, the second forward processing part 22 multiplies the internal signal and $[-2\pi j(k+\frac{1}{2})2N]$ into a local product, namely, a real part, to make the forward transformed signal represent the local product. In this event, the second forward processing part 22 will be referred to as an internal multiplying arrangement. A combination of the first forward processing, the second forward processing, and the forward FFT parts 21, 22, and 23 will be referred to as a transform carrying out arrangement.

Continuing reference to FIG. 2, the description will proceed to the inverse transform unit 12a. The inverse transform unit 12 comprises first inverse processing, second inverse processing, and inverse FFT parts 31, 32, and 33. The first inverse processing part 31 is connected to the second forward processing part 22 and is for processing the forward transformed signal into a processed signal.

The first inverse processing part 31 is supplied with the forward transformed signal as an apparatus input signal. The forward transformed signal is a succession of zeroth through (N−1)th apparatus input data.

The first inverse processing part 31 carries out multiplication between the zeroth through the (N−1)th apparatus input data and $\exp[2\pi j(N/4+\frac{1}{2})k/N]$ in accordance with Equation (18) into a first product to make the processed signal represent the first product. In this event, the first inverse processing part 31 will be referred to as a first multiplying arrangement.

The inverse FFT part 33 is connected to the first inverse processing part 31 and is for carrying out a linear inverse FFT on the processed signal in accordance with Equation (19) to produce an internal signal representative of a result of the inverse FFT. The internal signal is a succession of zeroth through (N−1)th internal data. In this event, the inverse FFT part 33 is herein referred to as an internal transform carrying out arrangement.

The second inverse processing part 32 is connected to the inverse FFT part 33 and is for carrying out multiplication between the zeroth through the (N−1)th internal data and $2\exp[-2\pi j(n+N/4+\frac{1}{2})/(2N)]$ in accordance with Equation (20) into a second product, namely, a real part, to make the inverse transformed signal represent the second product. In this event, the second inverse processing part 32 will be referred to as a second multiplying arrangement.

The second inverse processing part 32 is further connected to the inverse transform window part 17. The inverse transformed signal is sent from the second inverse processing part 32 to the inverse transform window part 17.

Figure 4:
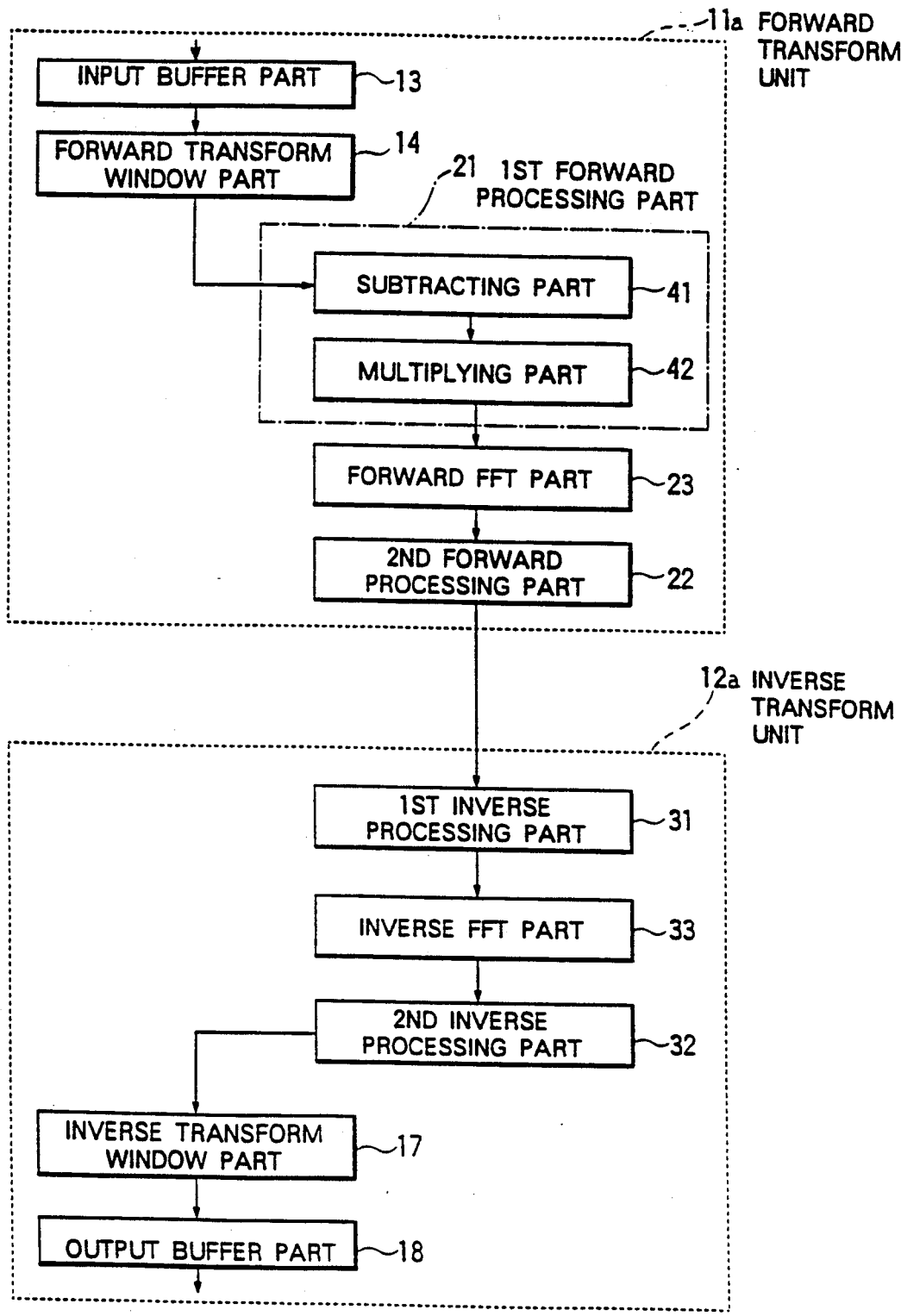
FIG. 4 is a block diagram of a calculation apparatus according to a second embodiment of this invention.

Referring to FIG. 4, the description will be directed to a calculation apparatus according to a second embodiment of this invention. The calculation apparatus comprises similar parts designated by like reference numerals. The forward transform window part 14 produces, as the product signal, a succession of zeroth through (3N/4−1)th and (3N/4)th through (N−1)th product data. The forward transform window part 14 will be referred to as a multiplying arrangement.

The first forward processing part 21 comprises subtracting and multiplying parts 41 and 42. The subtracting part 41 is connected to the forward transform window part 14 and is for producing a local signal in response to the product signal. The multiplying part 42 is connected to the subtracting part 41 and is for producing the processed signal in response to the local signal.

Figure 5:
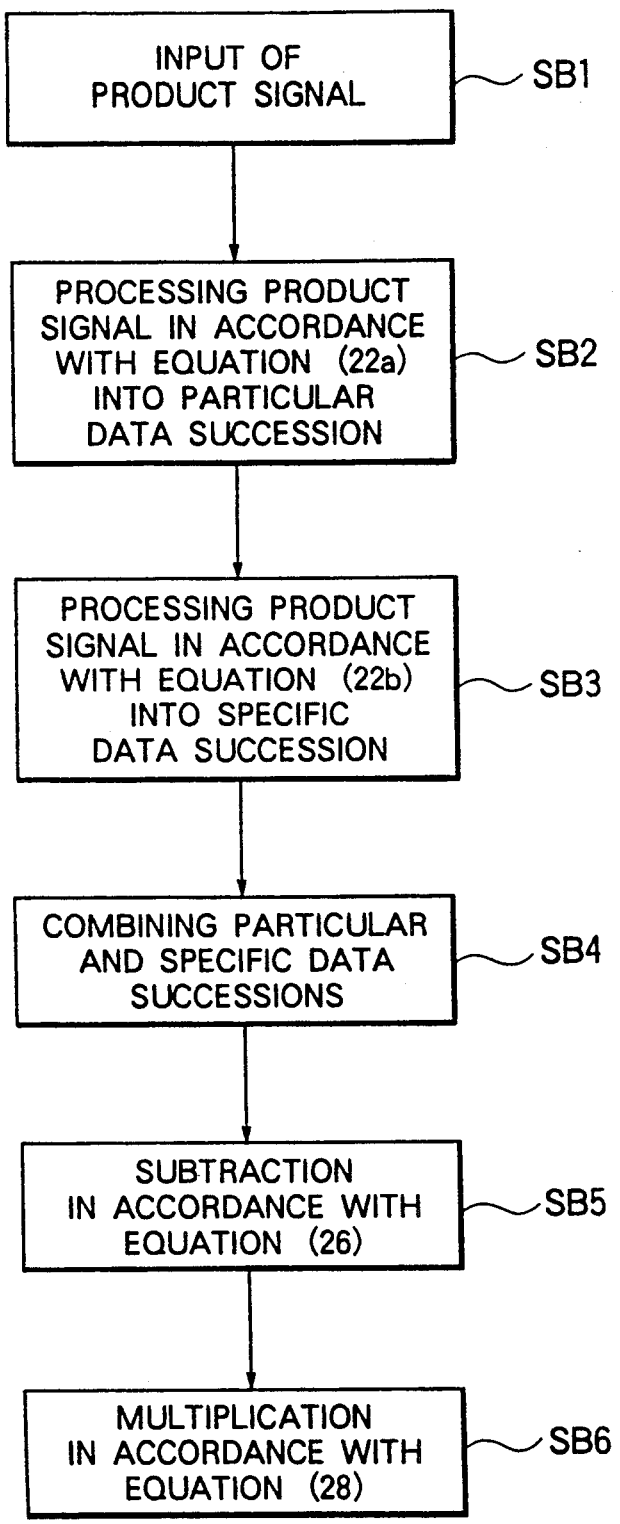
FIG. 5 is a flow chart for use in describing operation of a first forward processing part included in the calculation apparatus of FIG. 4.

Referring to FIG. 5 together with FIG. 4, the description will be made as regards operation of the first forward processing part 21. At a first stage SB1, the subtracting part 41 is supplied with the product signal from the forward transform window part 14. The first stage SB1 proceeds to a second stage SB2 at which the subtracting part 41 processes the zeroth through the (N/4−1)th product data into a succession of (3N/4) through Nth particular data having a negative polarity in common. In other words, the zeroth through the (N/4−1)th product data are processed in accordance with Equation (22a). The subtracting part 41 for carrying out the second stage SB2 will be referred to as a particular processing arrangement.

The second stage SB2 proceeds to a third stage SB3 at which the subtracting part 41 processes the zeroth through the (3N/4−1)th product data into a succession of zeroth through (N/4)th specific data having a positive polarity in common. In other words, the (N/4)th through the (N−1)th product data are processed in accordance with Equation (22b). The subtracting part 41 for carrying out the third stage SB3 will be referred to as a specific processing arrangement.

The third stage SB3 proceeds to a fourth stage SB4 at which the subtracting part 41 combines the particular and the specific data successions into a succession of zeroth through (N−1−2p)th and 2pth through (N−1)th combined data. When the fourth stage SB3 is carried out, the subtracting part 41 will be referred to as a combining arrangement.

The fourth stage SB4 proceeds to a fifth stage SB5 at which the subtracting part 41 subtracts the (N−1−2p)th combined datum from the 2pth combined datum in accordance with Equation (26) to produce a difference and the local signal that is representative of the difference. The subtracting part 41 for carrying out the fifth stage SB5 will be referred to as a subtracting arrangement.

The fifth stage SB5 proceeds to a sixth stage SB6 at which the multiplying part 42 carries out multiplication between $\exp(-2\pi jp/N)$ and the local signal in accordance with Equation (28) to produce an internal product to make the processed signal represent the internal product. The multiplying part 42 will be referred to as an internal multiplying arrangement.

Returning to FIG. 4, the forward FFT part 23 is connected to the multiplying part 42 and is for carrying out the linear forward FFT on the processed signal in accordance with Equation (30) to produce an internal signal representative of a result of the forward FFT. The forward FFT part 23 is herein referred to as an internal transform carrying out arrangement.

The second forward processing part 22 is connected to the forward FFT part 23 and is for processing the internal signal into the forward transformed signal in accordance with Equation (31). More particularly, the second forward processing part 22 carries out multiplication between the internal signal and $[-2\pi j(k+\frac{1}{2})/(2N)]$ into a local product, namely, a real part, to make the forward transformed signal represent the local product. In this event, the second forward processing part 22 will be referred to as an internal multiplying arrangement. A combination of the first forward processing, the second forward processing, and the forward FFT parts 21, 22, and 23 will be referred to as a transform carrying out arrangement.

Figure 6:
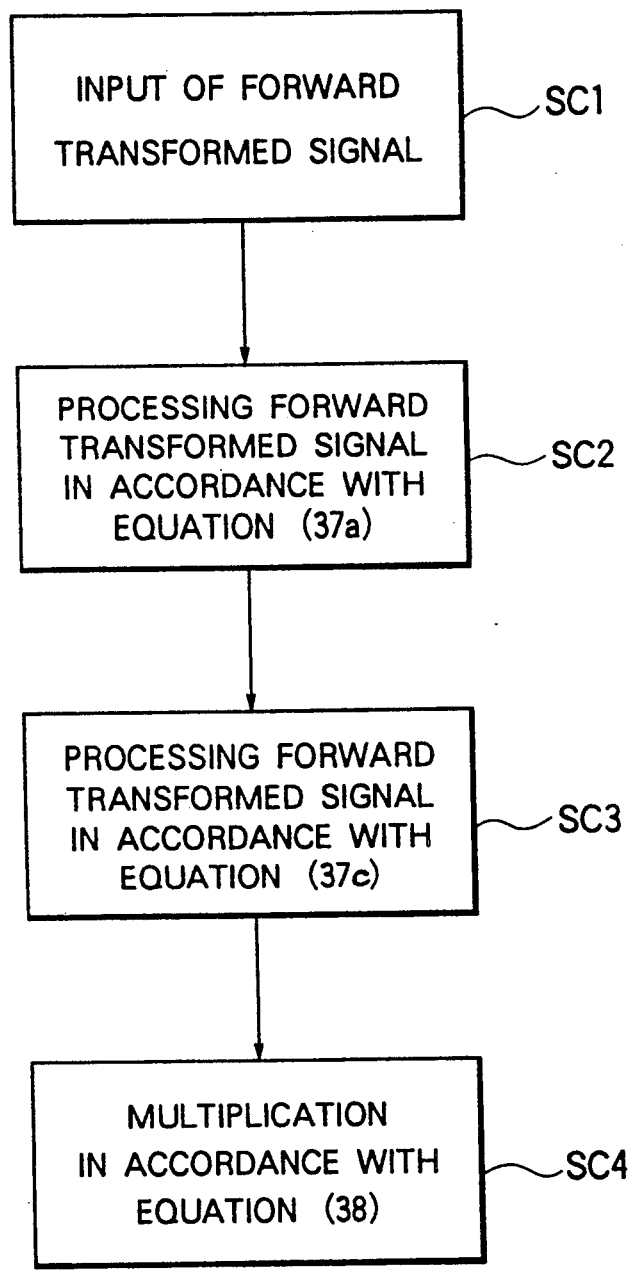
FIG. 6 is a flow chart for use in describing operation of a first inverse processing part included in the calculation apparatus of FIG. 4.

Referring to FIG. 6 together with FIG. 4, operation of the first inverse processing part 31 will be described at first. At a first stage SC1, the first inverse processing part 31 is supplied with the forward transformed signal from the second forward processing part 22. The first stage SC1 proceeds to a second stage SC2 at which the first inverse processing part 31 processes the 2kth apparatus input datum into a kth particular datum. In other words, the forward transformed signal is processed in accordance with Equation (37a). In this event, the first inverse processing part 16 will be referred to as a particular processing arrangement.

The second stage SC2 proceeds to a third stage SC3 at which the first inverse processing part 31 processes the (2k+1)th apparatus input datum into a (N−1−k)th specific datum. In other words, the forward transformed signal is processed in accordance with Equation (37c). In this event, the first inverse processing part 16 will be referred to as a specific processing arrangement.

The third stage SC3 proceeds to a fourth stage SC4 at which the first inverse processing part 31 carries out multiplication between $\exp(2\pi jk/N)$ and each of the kth particular and the (N−1−k)th specific data in accordance with Equation (38) into the processed signal. In this event, the first inverse processing part 16 will be referred to as a calculation arrangement.

In FIG. 4, the inverse FFT part 33 carries out the linear inverse FFT on the processed signal in accordance with Equation (40) to produce an internal signal representative of a result of the inverse FFT. The inverse FFT part 23 will be referred to as an internal transform carrying out arrangement.

Figure 7:
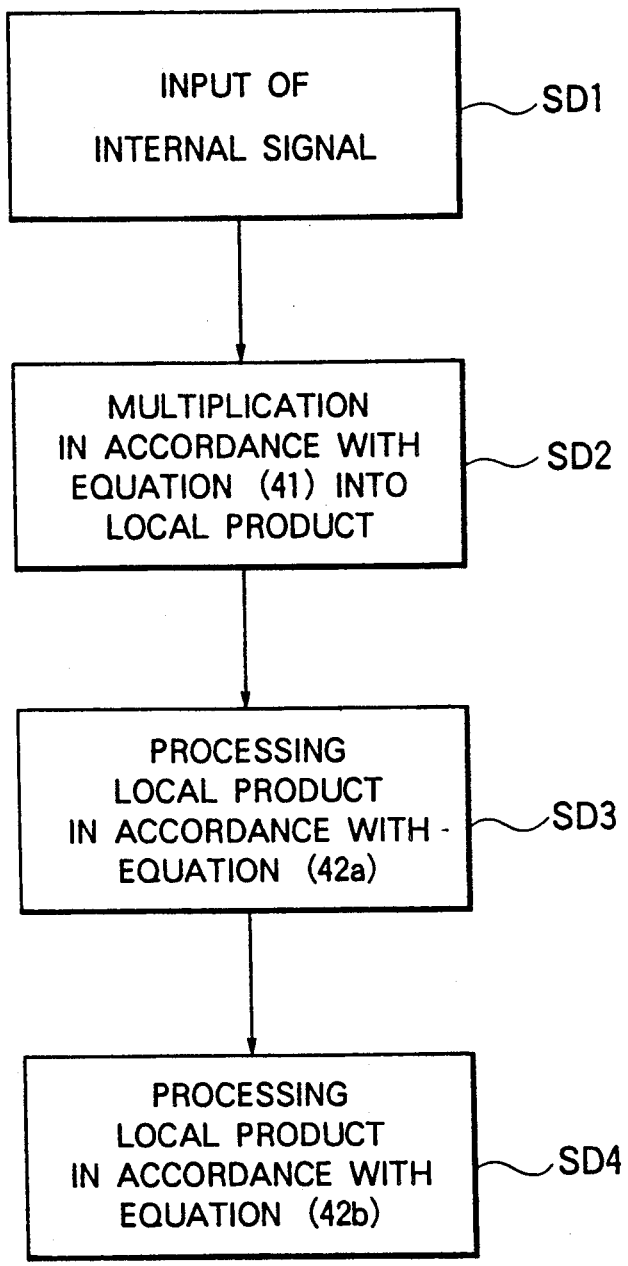
FIG. 7 is a flow chart for use in describing operation of a second inverse processing part included in the calculation apparatus of FIG. 4.

Referring to FIG. 7 together with FIG. 4, the description will be directed to operation of the second inverse processing part 32. The inverse FFT part 23 produces, as the internal signal, a succession of zeroth through (p−1)th and pth through (N/2−1)th internal data. At a first stage SD1, the second inverse processing part 32 is supplied with the internal signal from the inverse FFT part 23.

The first stage SD1 proceeds to a second stage SD2 at which the second inverse processing part 32 carries out multiplication between the pth internal datum and the $\exp[2\pi j(p+\frac{1}{2})/(2N)]$ in accordance with Equation (41) into a local product to make the inverse transformed signal represent the local product. The local product is a succession of zeroth through (N/4−1)th and (N/4)th through (N/2−1)th product data. In this event, the second inverse processing part 32 will be referred to as a multiplying arrangement.

The second stage SD2 proceeds to a third stage SD3 at which the second inverse processing part 32 processes the zeroth through the (N/4−1)th product data in accordance with Equation (42a) into a first succession of (3N/4−1)th through (N/2)th particular data in a descending order and a second succession of (3N/4)th through Nth particular data in an ascending order. The particular data of the first and the second successions have a first polarity in common. In this event, the second inverse processing part 32 will be referred to as a particular processing arrangement.

The third stage SD3 proceeds to a fourth stage SD4 at which the second inverse processing part 32 processes the (N/4)th through the (N/2−1)th product data in accordance with Equation (42b) into a first succession of zeroth through (N/4−1)th specific data in an ascending order and a second succession of (N/2−1)th through (N/4)th specific data in a descending order. The specific data of the first and the second successions have a second polarity in common. The second polarity is different from the first polarity. In this event, the second inverse processing part 32 will be referred to as a specific processing arrangement.

While the present invention has thus far been described in connection with only a few embodiment thereof, it will readily be possible for those skilled in the art to put this invention into practice in various other manners. For example, the block length N may be equal to 256 or 512.

What is claimed is:

1. An apparatus for carrying out a forward transform comprising:
   an input signal;
   a multiplier, said multiplier multiplying a predetermined forward transform window function and said input signal and outputting as a result a product signal;
   transform carrying out means connected to said multiplier for carrying out a linear forward transform on said product signal and for outputting a forward transformed signal representative of said linear forward transform, wherein said transform carrying out means further comprises:
   a first processing device connected to receive said product signal from said multiplier, said first processing device outputting a processed signal;
   means connected to said first processing device for receiving said processed signal and carrying out a forward fast Fourier transform on said processed signal and outputting an internal signal representative of said forward fast Fourier transform; and
   a second processing device connected to receive said internal signal from said means for carrying out a forward fast Fourier transform, said second processing device processing said internal signal and outputting as a result said forward transformed signal.

2. An apparatus as recited in claim 1, wherein said product signal produced by said multiplier, is a succession of zeroth through (N/4−1)th and (N/4)th through (N−1)th product data, where N represents an integral multiple of four;
   said first processing device includes a particular processing means connected to said multiplier for processing said zeroth through said (N/4−1)th product data into a succession of (3N/4) through Nth particular data having a first polarity in common;
   said first processing device further includes a specific processing means connected to said multiplier for processing said (N/4)th through said (N−1)th product data into a succession of zeroth through (3N/4−1)th specific data having a second polarity in common, said second polarity being different from said first polarity; and
   a calculating means is connected to said particular processing means, said specific processing means, and said means for carrying out a forward fast Fourier transform, for calculating said processed signal by using a predetermined signal and each of said (3N/4) through said Nth particular and said zeroth through said (3N/4−1)th specific data.

3. An apparatus as recited in claim 2, wherein said predetermined signal represents $\exp(-2\pi jn/(2N))$, and said calculating means multiplies said $\exp(-2\pi jn/(2N))$ and each of said (3N/4) through said Nth particular data and said zeroth through the (3N/4−1)th specific data to produce said processed signal, where j represents an imaginary unit, n being variable between 0 and N−1, both inclusive.

4. An apparatus as recited in claim 2, wherein said calculating means comprises:
   combining means connected to said particular and said specific processing means for combining said particular and said specific data successions into a succession of zeroth through (N−1−2p)th and 2pth through (N−1)th combined data, where p is variable between 0 and N/2−1, both inclusive;
   a subtractor connected to said combining means, said subtractor subtracting said (N−1−2p)th combined datum from said 2pth combined datum to produce a difference and output a local signal representative of said difference; and
   internal multiplying means connected to said subtractor and said means for carrying out a forward fast Fourier transform, for multiplying a predetermined signal with said local signal into an internal product to make said processed signal represent said internal product.

5. An apparatus as recited in claim 4, wherein said predetermined signal represents $\exp(-2\pi jp/N)$, and said internal multiplying means multiples said $\exp(-2\pi jp/N)$ and said local signal to produce said processed signal, where j represents an imaginary unit, p being variable between 0 and N−1, both inclusive.

6. An apparatus as recited in claim 1, wherein said internal signal is a succession of zeroth through (K−1)th and kth through (N/2−1)th internal data, where N represents an integral multiple of four, k being variable between 0 and N−1, both inclusive, and wherein said second processing device includes internal multiplying means connected to said means for carrying out a forward fast Fourier transform, for multiplying said kth internal datum and $\exp(-2\pi j(k+\frac{1}{2})/(2N))$ into a local product to make said forward transformed signal represent said local product, where j represents an imaginary number.

7. An apparatus for carrying out an inverse transform comprising:
   an input signal;
   transform carrying out means for carrying out a linear inverse transform on said input signal and for outputting an inverse transformed signal representative of a result of said linear inverse transform;
   a multiplier connected to said transform carrying out means, said multiplier multiplying a predetermined inverse transform window function and said inverse transformed signal to produce a product signal; wherein said transform carrying out means comprises:
   a first processing device which receives said input signal and outputs a processed signal;
   internal transform carrying out means connected to said first processing device for carrying out an inverse fast Fourier transform on said processed signal and for outputting as a result of said inverse fast Fourier transform an internal signal; and
   a second processing device connected to said internal transform carrying out means to receive said internal signal and output as a result of processing said internal signal said inverse transformed signal.

8. An apparatus as recited in claim 7, said input signal being a succession of zeroth through (N−1)th apparatus input data, where N represents an integral multiple of four, wherein said first processing device includes a first multiplier, said multiplier multiplying said zeroth through said (N−1)th apparatus input data and $\exp(2\pi(N/4+\frac{1}{2})k/N)$ and outputting as a result a first product, said processed signal representing said first product, where j represents an imaginary unit, k being variable between 0 and N−1, both inclusive.

9. An apparatus as recited in claim 7, said internal transform carrying out means producing, as said internal signal, a succession of zeroth through (N−1)th internal data, where N represents an integral multiple of four, wherein said second processing device includes a second multiplier connected to said internal transform carrying out means, said multiplier multiplying said zeroth through said (N−1)th internal data and exp(−2πj(n+N/4+½)/(2N)) into a second product, said inverse transformed signal representing said second product, where j represents an imaginary unit, n being variable between 0 and N−1, both inclusive.

10. An apparatus as recited in claim 7, wherein said input signal is a succession of zeroth through (N/2−1)th apparatus input data, where N represents an integral multiple of four;
   said first processing device includes a particular processing means for processing said 2kth apparatus input datum into a kth particular datum, where k is variable between 0 and N/2−1, both inclusive and a specific processing means for processing said (2k+1)th apparatus input datum into a (N−1−k)th specific datum; and
   a calculating means connected to said particular and said specific processing means for calculating said processed signal by using a predetermined signal and each of said kth particular and said (N−1−k)th specific data.

11. An apparatus as recited in claim 10, wherein said predetermined signal represents exp(2πjk/N), where j represents an imaginary unit, and said calculating means multiplies said predetermined signal and said kth particular datum.

12. An apparatus as recited in claim 7, said internal transform carrying out means producing, as said internal signal, a succession of zeroth through (p−1)th and pth through (N/2−1)th internal data, where N represents an integral multiple of four, p being variable between 0 and (N/2−1), both inclusive, wherein said second processing device comprises:
   a multiplier connected to said internal transform carrying out means, said multiplier multiplying said pth internal datum and exp(2πj(p+½)/2N) resulting in a local product to make said inverse transformed signal represent said local product, j representing an imaginary unit, said local product being a succession of zeroth through (N/4−1)th and (N/4)th through (N/2−1)th product data;
   a particular processing means connected to said multiplier for processing said zeroth through said (N/4−1)th product data into a first succession of (3/N4−1)th through (N/2)th particular data in a descending order and a second succession of (3N/4)th through Nth particular data in an ascending order, said particular data of said first and said second successions having a first polarity in common; and
   a specific processing means connected to said multiplier for processing said (N/4)th through (N/2−1)th product data into a first succession of zeroth through (N/4−1)th specific data in an ascending order and a second succession of (N/2−1)th through (N/4)th specific data in a descending order, the specific data of said first and said second successions having a second polarity in common, said second polarity being different from said first polarity.

* * * * *